(12) United States Patent
Shinozaki et al.

(10) Patent No.: US 8,128,978 B2
(45) Date of Patent: Mar. 6, 2012

(54) METHOD FOR PREVENTING OFF-FLAVOR IN BEVERAGE COMPOSITION

(75) Inventors: Satoshi Shinozaki, Sagamihara (JP); Toshimasa Higuchi, Sagamihara (JP); Ryoko Ishikawa, Sagamihara (JP)

(73) Assignee: Calpis Co., Ltd., Tokyo (JP)

( * ) Notice: Subject to any disclaimer, the term of this patent is extended or adjusted under 35 U.S.C. 154(b) by 822 days.

(21) Appl. No.: 11/921,902

(22) PCT Filed: Jun. 9, 2006

(86) PCT No.: PCT/JP2006/311601
§ 371 (c)(1),
(2), (4) Date: Jun. 5, 2008

(87) PCT Pub. No.: WO2006/132353
PCT Pub. Date: Dec. 14, 2006

(65) Prior Publication Data
US 2009/0220647 A1 Sep. 3, 2009

(30) Foreign Application Priority Data
Jun. 10, 2005 (JP) .................................. 2005-171227

(51) Int. Cl.
A23L 1/29 (2006.01)
A23L 2/66 (2006.01)

(52) U.S. Cl. .............. 426/590; 426/36; 426/42; 426/72; 426/580

(58) Field of Classification Search .................. 426/478, 426/481, 518, 549, 622, 590, 580, 72, 36, 426/42
See application file for complete search history.

(56) References Cited

U.S. PATENT DOCUMENTS

| 5,641,531 A | 6/1997 | Liebrecht et al. |
| 6,207,208 B1 | 3/2001 | Irwin et al. |

FOREIGN PATENT DOCUMENTS

| CN | 1351473 A | 5/2002 |
| EP | 1415650 A1 | 5/2004 |
| JP | 3-272643 A | 12/1991 |
| JP | 10-84866 A | 4/1998 |
| JP | 11-508282 A | 7/1999 |
| JP | 11-243866 A | 9/1999 |
| JP | 11-512604 A | 11/1999 |
| JP | 2002-119250 A | 4/2002 |
| JP | 2002-255846 | * 9/2002 |
| JP | 2002-255846 A | 9/2002 |
| JP | 2003-500036 A | 1/2003 |
| JP | 2004-521653 A | 7/2004 |
| JP | 2005-110649 A | 4/2005 |
| JP | 2006-111566 A | 4/2006 |
| JP | 2006-180812 A | 7/2006 |
| WO | WO-97/11614 A1 | 4/1997 |
| WO | WO 97/39749 A2 | 10/1997 |
| WO | WO 99/56564 A2 | 11/1999 |
| WO | WO-00/70972 A1 | 11/2000 |
| WO | WO-02/094039 A1 | 11/2002 |
| WO | WO 03/007730 A1 | 1/2003 |
| WO | WO 03/043446 A1 | 5/2003 |

OTHER PUBLICATIONS

Informational reference definition of "collagen peptide". //www.wisegeek.com/what-is-collagen-peptide.htm, 2003-2011, one page.*
Office Action dated Oct. 13, 2010 for Chinese Application No. 200680020316.0.
Extended European Search Report dated Jan. 3, 2011 for European Application No. 06766513.3.
Office Action dated Aug. 16, 2011 for corresponding Japanese Application No. 2007-520180.
Min et al., "Chemistry and Reaction of Singlet Oxygen in Foods", Comprehensive Reviews in Food Science and Food Safety, 2002, vol. 1, pp. 58-72.

* cited by examiner

*Primary Examiner* — Helen F Heggestad
(74) *Attorney, Agent, or Firm* — Birch, Stewart, Kolasch & Birch, LLP

(57) ABSTRACT

A beverage composition is disclosed that comprises a mixture of a protein hydrolysate and vitamin B2, and also contains an amount of ascorbic acid sufficient to prevent the generation of an off-flavor when the mixture is exposed to light. The off-flavor generated upon exposure to light can be reduced in accordance with the beverage composition of the present invention. Also disclosed is a method for preventing an off-flavor in a beverage composition containing a protein hydrolysate and vitamin B2, and a process for producing a beverage composition containing a protein hydrolysate and vitamin B2. Furthermore, an agent for preventing an off-flavor in a beverage composition containing a protein hydrolysate and vitamin B2, wherein the agent comprises ascorbic acid as an active ingredient is disclosed.

8 Claims, No Drawings

METHOD FOR PREVENTING OFF-FLAVOR IN BEVERAGE COMPOSITION

FIELD OF THE INVENTION

The present invention relates to a beverage composition, process for producing the same, and a method for preventing off-flavor in the same.

BACKGROUND OF THE INVENTION

Vitamin B2 is a vitamin that functions as a cofactor to flavoenzymes in the intracellular redox system and the mitochondrial electron transport system, and therefore it is widely involved in the metabolism of sugars, lipids, and proteins in the body. Because vitamin B2 plays a role in aiding growth and reproduction; making healthy skin, nails, and hair; easing inflammation in the mouth, lips, and tongue; promoting good vision; and alleviating eye fatigue; and together with other substances, it participates in the metabolism of carbohydrates, lipids, and proteins; aids in the release of energy to various cells; and aids in the formation of red blood cells, it is widely used as an additive in nutritionally supplemented food products.

Vitamin B2 is water soluble and even if it is ingested in excess, the extraneous amount is rapidly excreted from the body, and thus almost no damage resulting from overconsumption occurs. Moreover, vitamin B2 toxicity has not been reported. Therefore, vitamin B2 is often used as an ingredient in supplements in combination with other B-vitamins.

Protein hydrolysate has excellent digestion and absorption properties, and it is widely used as a raw material in supplements and functional foods. Moreover, it has been reported that the various peptides contained in protein hydrolysate have physiological functions such as an antihypertensive effect, muscle fatigue recovery promoting effect, lipid metabolism promoting effect, and an immunostimulatory effect.

It has been found that, however, when a beverage product containing both a protein hydrolysate and vitamin B2 is exposed to light, an off-flavor is generated. Because combinations of protein hydrolysate+vitamin B2+vitamin C are often seen in tablets and powdered form, it appears that this off-flavor problem is specific to liquids.

It is known that vitamin B2 is soluble in water and is resistant to acids and heat, but it will be broken down under strong light or by bases, Therefore, when only vitamin B2 is contained in a liquid, the problem of vitamin B2 photodegradation may occur, whereas no off-flavor will be generated. In addition, if the vitamin B2 photodegradation is the only issue, blocking the light using a dark brown bottle should be effective, but the problem of an off-flavor still could not be solved.

Therefore, a method is needed to solve the problem of the off-flavor that is generated when a beverage containing both a protein hydrolysate and vitamin B2 is exposed to light.

Japanese Patent Application Laid-open No. 2005-110649 discloses a method for improving the undesirable peptide odor by adding an extract of Lo Han Kuo (*Momordica grosvenori*) and trehalose. Japanese Patent Application Laid-open No. 2006-111566 discloses a method for suppressing the off-flavor in a liquid agent for internal use containing methionine and vitamin B2 by adding a component for inhibiting the generation of active oxygen or a polyglyceryl fatty acid ester.

An object of the present invention is to provide a technique for reducing the off-flavor generated when a combination of protein hydrolysate and vitamin B2 is exposed to light.

SUMMARY OF THE INVENTION

The inventors have found that a remarkable reduction of the off-flavor can be obtained by adding ascorbic acid to a beverage containing protein hydrolysate and vitamin B2, to achieve the present invention.

The present invention provides a beverage composition containing a mixture of a protein hydrolysate and vitamin B2, and an amount of ascorbic acid sufficient to prevent the generation of an off-flavor when the mixture is exposed to light. Preferably, the protein hydrolysate contains 30% or more amino acids. In addition, the amount of ascorbic acid is preferably 4 or more times (by weight) greater than the amount of amino acids. Also preferably, the protein hydrolysate is obtained by hydrolysis of casein by a proteolytic enzyme In another embodiment, the present invention provides a method for preventing an off-flavor in a beverage composition containing a protein hydrolysate and vitamin B2 comprising adding ascorbic acid to a mixture of the protein hydrolysate and vitamin B2.

In another embodiment, the present invention provides a process for preparing a beverage composition containing a protein hydrolysate and vitamin B2 comprising adding ascorbic acid to a mixture of the protein hydrolysate and vitamin B2.

In another embodiment, the present invention provides an agent for preventing an off-flavor in a beverage composition containing a protein hydrolysate and vitamin B2, the agent comprising ascorbic acid as an active ingredient.

As shown by the organoleptic evaluation data in the following Examples, the addition of ascorbic acid to a beverage containing a protein hydrolysate and vitamin B2 resulted in reducing the off-flavor generated when the beverage is exposed to light.

DESCRIPTION OF THE PREFERRED EMBODIMENTS

In the present invention, any ascorbic acid product commercially available as a food and beverage additive may be used as the ascorbic acid. The amount of ascorbic acid to be added is 0.01 to 3.0 wt %, preferably 0.05 to 1.0 wt % with respect to the amount of the beverage product. If the amount exceeds 1.0 wt %, the flavor of the beverage may become too strongly acidic, or the odor of ascorbic acid degradation may become too strong. Preferably, the amount of ascorbic acid is 4 or more times (by weight) greater than the amount of amino acids, and more preferably 10 times or more (by weight) greater than the amount of amino acids.

The protein hydrolysate is obtained by degradation of a protein by a proteolytic enzyme, and is a mixture containing peptides and free amino acids. Preferably, the protein hydrolysate contains 30% or more amino acids. Any protein hydrolysate purified to the extent that it can be used as a food product may be used as the protein hydrolysate, including, for example, a protein hydrolysate obtained by the degradation of casein or soybean protein by a proteolytic enzyme. Any proteolytic enzyme that belongs to the class of enzymes that can degrade a protein into peptides and be used for manufacturing a food product may be used for the proteolytic enzyme, including, for example, a proteolytic enzyme originating in *Aspergillus oryzae*. The proteolytic enzyme can be added in the amount of 0.01 to 10.0 wt %, preferably 0.05 to 5.0 wt % with respect to the amount of the beverage product.

Any commercially available vitamin B2 that is purified to the extent that it can be used in a food product additive may be used in the present invention. Vitamin B2 can be added at 0.0001 to 0.02 wt %, preferably 0.0001 to 0.01 wt % with respect to the amount of the beverage product.

Additionally, fruit juices, milk products, sugars, sweeteners, flavorings, thickeners, pH regulators, colorings, and the like can be added to the beverage containing the protein hydrolysate and vitamin B2.

The contents of all patents and other reference documents cited for purposes of elucidation in this specification are hereby incorporated by reference in its entirety. In addition, the content of the specification and drawings of Japanese Patent Application 2005-171227, which is the basis for the priority claim of this application, are hereby incorporated by reference in its entirety.

The present invention is described in detail by the Examples below, but is not limited by those examples. Unless otherwise specifically noted, in the units of the following formulations, the percent sign (%) means percent by weight (wt %).

Example 1

Preparation of Protein Hydrolysate

One gram of casein from milk (Nippon NZMP, Ltd.) was added to 99 g of distilled water adjusted to at approximately 80° C. and stirred thoroughly, then the pH was adjusted to 7.0 by adding 1N sodium hydroxide solution (Wako Pure Chemical Industries, Ltd.), and the temperature was adjusted to 20° C. to prepare a stock solution.

Proteolytic enzyme from *Aspergillus oryzae* (Sumizyme FP™, Shin-Nihon-Kagaku-Kogyo) was added to the stock solution obtained above such that the proteolytic enzyme/casein weight ratio is 1/25, and the mixture was reacted for 14 hours at 50° C. The enzyme was then deactivated by autoclaving the mixture for 10 minutes at 110° C. to obtain a solution of casein enzyme degradation product. Next, the enzyme degradation product solution was dried by a spray dryer to prepare a powder.

The casein enzyme degradation product was analyzed with an amino acid analyzer using the Kjeldahl method. It was found that the powder contained 35.8% amino acids and 45.7% peptides. The peptide content was calculated by subtracting the weight of the amino acids from the weight of the protein.

Preparation of Beverage Containing Protein Hydrolysate

A liquid formulation containing the following ingredients was prepared.

TABLE 1

| | |
|---|---|
| Granulated sugar | 12% |
| Citric acid | 0.75% |
| Casein enzyme degradation product | 0.65% |
| Riboflavin phosphate sodium salt (Vitamin B2) | 0.0078% |
| Flavoring | 0.15% |
| Trisodium citrate | 0.03% |
| Total | 100% |

To the liquid formulation prepared according to the above table, designated amounts of ascorbic acids rutin, bayberry extract, chlorogenic acid, and pomegranate extract were added as an antioxidant and dissolved in the formulation. The formulation was sterilized at 96° C. for 30 seconds and placed in 100 mL dark brown bottles to prepare a nutritional drink beverage containing both the casein degradation product and vitamin B2.

Organoleptic Evaluation

Each beverage was exposed to 20000 1× of fluorescent light at 15° C. for 7 days. An organoleptic evaluation was performed by 10 researchers of beverage development, and the deterioration of flavor of the beverage samples was compared with that of a liquid formulation without adding antioxidant that was stored in a dark, refrigerated environment (5° C.) (control product). In addition, a liquid formulation prepared without adding the casein enzyme degradation product was also evaluated as a reference. The average score of each beverage was calculated based on the following criteria.

Scoring Criteria 3 points: Generally no difference from the control product
2 points: Flavor different from the control product
1 point: Flavor considerably different from the control product

TABLE 2

| Type of antioxidant | Amount added (ppm) | Mean score (n = 10) | Ratio of ascorbic acid/amino acid |
|---|---|---|---|
| Ascorbic acid | 5000 | 2.3 | 21 |
| | 2500 | 2.2 | 11 |
| | 1000 | 1.6 | 4.3 |
| | 500 | 1.3 | 2.1 |
| Rutin | 100 | 1.0 | — |
| Bayberry extract | 100 | 1.0 | — |
| Chlorogenic acid | 100 | 1.1 | — |
| Pomegranate extract | 50 | 1.1 | — |
| Not added | 0 | 1.0 | — |
| Casein degradation product not added | 0 | 2.8 | — |

The above results demonstrates that the addition of ascorbic acid to a beverage containing a protein hydrolysate and vitamin B2 reduces the off-flavor generated when the beverage is exposed to light.

Example 2

Investigation of Peptide Component Causing Off-Flavor

A beverage containing vitamin B2 and a peptide material was prepared, and the off-flavor generated upon exposure to light was investigated. Casein peptide and soybean peptide were used as the peptide materials.

TABLE 3

| Ingredient | Content |
|---|---|
| Granulated sugar | 5 g |
| Citric acid | 0.35 g |
| Riboflavin phosphate sodium salt | 0.007766 g |
| Peptide material | 0.65 g of each peptide material |
| Trisodium citrate | 0.18 g |
| Water | up to 100 mL |

A liquid formulation containing the above ingredients was prepared, sterilized at 96° C. for 30 seconds, and placed in 100 mL dark brown bottles.

Each beverage was exposed to 20000 1× of fluorescent light at 15° C. for 5 days. An organoleptic evaluation was performed by 10 researchers of beverage development, and the deterioration of flavor of the beverage samples was compared with that of a liquid formulation that was stored in a dark, refrigerated environment (5° C.) (control product). The average score of each beverage was calculated based on the following criteria.

Scoring Criteria 3 points: Generally no difference from the control product
2 points: Flavor different from the control product
1 point: Flavor considerably different from the control product The results are shown in Table 4.

TABLE 4

| | Material | Amino acid content | Mean score (n = 10) |
|---|---|---|---|
| Peptide material | Casein peptide | 36% | 0.5 |
| | Soybean peptide | 77% | 0.1 |

[Note 2]

From the above results it appears that the off-flavor is generated by photodegradation of the combination of the peptide material containing amino acids and vitamin B2.

INDUSTRIAL APPLICABILITY

The present invention is useful for the manufacture of beverages containing vitamin B2.

The invention claimed is:

1. A beverage composition containing a mixture of (i.) a protein hydrolysate comprising 30% or more amino acids and (ii.) vitamin B2, wherein said beverage composition comprises (iii.) an amount of ascorbic acid sufficient to prevent the generation of an off-flavor when said mixture is exposed to light, said amount of ascorbic acid being 4 or more times (by weight) greater than the amount of amino acids in said protein hydrolysate.

2. The beverage composition according to claim 1, wherein the protein hydrolysate is obtained by hydrolysis of casein by a proteolytic enzyme.

3. A method for preventing an off-flavor in a beverage composition containing a protein hydrolysate comprising 30% or more amino acids and vitamin B2, said method comprising
adding ascorbic acid, in an amount which is 4 or more times (by weight) greater than the amount of amino acids in said protein hydrolysate, to the mixture of the protein hydrolysate and vitamin B2.

4. The method according to claim 3, wherein the protein hydrolysate is obtained by hydrolysis of casein by a proteolytic enzyme.

5. A process for producing a beverage composition containing a protein hydrolysate comprising 30% or more amino acids and vitamin B2, said method comprising
adding ascorbic acid, in an amount which is 4 or more times (by weight) greater than the amount of amino acids in said protein hydrolysate, to the mixture of the protein hydrolysate and vitamin B2.

6. The process according to claim 5, wherein the protein hydrolysate is obtained by hydrolysis of casein by a proteolytic enzyme.

7. An agent for preventing an off-flavor in a beverage composition containing (i.) a protein hydrolysate comprising 30% or more amino and (ii.) vitamin B2, wherein said agent comprises (iii.) an amount of ascorbic acid sufficient to prevent the generation of an off-flavor upon exposure to light, said amount of ascorbic acid being 4 or more times (by weight) greater than the amount of amino acids in said protein hydrolysate, as an active ingredient.

8. The agent for preventing an off-flavor according to claim 7, wherein the protein hydrolysate is obtained by hydrolysis of casein by a proteolytic enzyme.

* * * * *